(12) United States Patent
Kim

(10) Patent No.: US 10,703,229 B2
(45) Date of Patent: Jul. 7, 2020

(54) SEAT PUMPING DEVICE FOR VEHICLE

(71) Applicant: Hyundai Dymos Incorporated, Seosan, Chungcheongnam-do (KR)

(72) Inventor: Won Kim, Gyeonggi-do (KR)

(73) Assignee: Hyundai Dymos Incorporated, Seosan, Chungcheongnam-do (KR)

( * ) Notice: Subject to any disclaimer, the term of this patent is extended or adjusted under 35 U.S.C. 154(b) by 8 days.

(21) Appl. No.: 16/199,625

(22) Filed: Nov. 26, 2018

(65) Prior Publication Data

US 2019/0193598 A1 Jun. 27, 2019

(30) Foreign Application Priority Data

Dec. 26, 2017 (KR) .......................... 10-2017-0180231

(51) Int. Cl.
*B60N 2/16* (2006.01)
(52) U.S. Cl.
CPC ............. *B60N 2/168* (2013.01); *B60N 2/165* (2013.01); *B60N 2/1685* (2013.01)
(58) Field of Classification Search
CPC ...... B60N 2/168; B60N 2/165; B60N 2/1685; B60N 2/169
See application file for complete search history.

(56) References Cited

U.S. PATENT DOCUMENTS

| | | | | |
|---|---|---|---|---|
| 6,481,557 B2 * | 11/2002 | Denis | ..................... | B60N 2/167 192/15 |
| 8,678,154 B2 * | 3/2014 | Kim | ...................... | B60N 2/167 192/38 |
| 9,051,978 B2 * | 6/2015 | Karthaus | ................ | B60N 2/169 |
| 9,469,219 B2 * | 10/2016 | Kim | ......................... | B60N 2/22 |
| 9,821,685 B2 * | 11/2017 | Kim | ...................... | B60N 2/165 |
| 2015/0314708 A1 * | 11/2015 | Kim | ...................... | B60N 2/165 297/344.12 |
| 2017/0120777 A1 * | 5/2017 | Ng | ......................... | F16D 41/088 |
| 2017/0253149 A1 * | 9/2017 | Chae | .................... | B60N 2/1635 |
| 2018/0001794 A1 * | 1/2018 | Kim | ...................... | B60N 2/938 |
| 2019/0047444 A1 * | 2/2019 | Sato | ...................... | F16D 63/006 |
| 2019/0193599 A1 * | 6/2019 | Kim | ...................... | B60N 2/168 |

FOREIGN PATENT DOCUMENTS

| | | |
|---|---|---|
| KR | 10-2007-0096771 A | 10/2007 |
| KR | 10-2011-0054712 A | 5/2011 |
| KR | 10-2013-0024640 A | 3/2013 |
| KR | 101607203 B1 | 3/2016 |
| KR | 10-1725410 B1 | 4/2017 |
| KR | 10-1774341 B1 | 9/2017 |

* cited by examiner

*Primary Examiner* — Philip F Gabler
(74) *Attorney, Agent, or Firm* — Mintz Levin Cohn Ferris Glovsky and Popeo, P.C.; Peter F. Corless

(57) ABSTRACT

Disclosed is a seat pumping device for a vehicle, the seat pumping device including: a clutch drum turned by receiving torque of a lever and having a plurality of compressing protrusions radially formed along an edge thereof to be spaced apart from each other; a brake drum coupled to the clutch drum and having a circular vertical flange protruding toward the clutch drum, the vertical flange having a plurality of supporting protrusions protruding laterally of the vertical flange to be arranged between the compressing protrusions; and a securing portion provided between the vertical flange and the clutch drum which face each other, the securing portion guiding a relative turning of the clutch drum and the brake drum while blocking a relative translation of the clutch drum and the brake drum.

11 Claims, 4 Drawing Sheets

SEAT PUMPING DEVICE FOR VEHICLE

CROSS REFERENCE TO RELATED APPLICATION

The present application claims priority to Korean Patent Application No. 10-2017-0180231, filed Dec. 26, 2017, which is incorporated herein by reference.

BACKGROUND OF THE INVENTION

Field of the Invention

The present invention relates generally to a seat pumping device for a vehicle and, more particularly, to a seat pumping device for a vehicle, the seat pumping device being capable of preventing undesirable movement of components inside the vehicle from occurring due to an external force.

Description of the Related Art

As well known in the art, a seat pumping device for a vehicle denotes a device which is mounted to a seat to allow an occupant on the seat to manually adjust a height of the seat. Specifically explained, when the occupant on the seat operates a lever, which is mounted on a lateral side of a seat cushion, clockwise or counterclockwise, an operating force exerted on the lever by the occupant is transmitted to a link mechanism, causing the seat cushion to be moved upward or downward. Herein, the pumping device for a vehicle provided between the lever and the link mechanism transmits torque of the lever to the link mechanism.

To this end, as disclosed in Korean Patent No. 10-1774341, the seat pumping device for a vehicle includes: a lever bracket turned in conjunction with the lever; a return spring guide equipped with a return spring that provides a restoring force to the lever bracket; a drum-shaped housing mounted inside a seat cushion, the housing including a clutch device provided therein and secured to the lever bracket to transmit torque of the lever, and a brake device provided therein and blocking reverse input torque to maintain a height of the seat cushion; and a housing cover covering the housing.

Such a seat pumping device for a vehicle is configured with a lever part, a clutch part, and a brake part. The lever part receives an operating force exerted by a user and transmits the operating force to the clutch part, and the clutch part transmits the input operating force exerted by the user to a link means of the seat cushion. Furthermore, the brake part blocks reverse input torque to cause the link means having been completed in operation to be locked in position.

However, there is a problem in that an external force generated from outside of the seat pumping device for a vehicle causes undesirable movement of internal components of the device to occur in a direction other than a turning axis direction, leading to inconvenience to an occupant. Accordingly, it is required to reduce the undesirable movement of the internal components which occurs due to the external force introduced from the lever, and to assist turning movement between the internal components so as to operate along desired tracks closest to the design specification.

Furthermore, when an excessive external force is introduced from the lever, there is a problem in that the components inside the device are turned beyond an operating angle, and a technique of solving such a problem is required.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention provides a seat pumping device for a vehicle, the seat pumping device being capable of preventing undesirable movement of internal components from occurring during operation of the device and thus improving operational comfort.

In order to achieve the above objective, according to one aspect of the present invention, there is provided a seat pumping device for a vehicle, the seat pumping device including: a clutch drum turned by receiving torque of a lever and having a plurality of compressing protrusions radially formed along an edge thereof to be spaced apart from each other; a brake drum coupled to the clutch drum and having a circular vertical flange protruding toward the clutch drum, the vertical flange having a plurality of supporting protrusions protruding laterally of the vertical flange to be arranged between the compressing protrusions; and a securing portion provided between the vertical flange and the clutch drum which face each other, the securing portion guiding a relative turning of the clutch drum and the brake drum while blocking a relative translation of the clutch drum and the brake drum.

A plurality of securing portions may be provided to be arranged at positions spaced apart from each other.

The securing portions may be circumferentially arranged along a circle of which center coincides with a turning axis of either of the clutch drum and the brake drum, at positions spaced apart from each other.

The securing portion may include: a securing protrusion protruding from the clutch drum or the vertical flange toward the clutch drum or the vertical flange not having the securing protrusion; and an insertion slot formed on a surface of the clutch drum or the vertical flange not having the securing protrusion, the surface facing the clutch drum or the vertical flange having the securing protrusion, such that the securing protrusion is inserted into the insertion slot.

The securing protrusion may protrude from the clutch drum toward the vertical flange, and the insertion slot may be formed on a surface of the vertical flange, the surface facing the clutch drum.

The securing protrusion may protrude from the vertical flange toward the clutch drum, and the insertion slot may be formed on a surface of the clutch drum, the surface facing the vertical flange.

A plurality of securing protrusions and a plurality of insertion slots may be provided, such that a part of the securing protrusions protrudes from clutch drum toward the vertical flange while a remaining part of the securing protrusions protrudes from the vertical flange toward the clutch drum, and a part of the insertion slots is formed on a surface of the vertical flange, the surface facing the clutch drum, correspondingly to the securing protrusions while a remaining part of the insertion slots is formed on a surface of the clutch drum, the surface facing the vertical flange.

The securing protrusion may be configured such that a protruding end thereof has a hemispherical shape, and the insertion slot may be circumferentially positioned on a circle of which center coincides with a turning axis of the clutch drum and the brake drum that are turned relative to each other such that the securing protrusion is seated in the insertion slot to guide the relative turning of the clutch drum and the brake drum.

A circumferential turning range of the insertion slot may be formed such that the securing protrusion is seated in the insertion slot to a turning angle at which the clutch drum is turned relative to the brake drum to transmit torque to the brake drum.

The securing protrusions and the insertion slots may be arranged at the same angular interval as either of the compressing protrusions and the supporting protrusions.

The respective securing protrusions securing protrusions may be arranged to protrude from the clutch drum inwardly of the compressing protrusions, while the respective insertion slots may be arranged between the supporting protrusions of the vertical flange.

According to the seat pumping device for a vehicle according to the present invention, it is possible to facilitate coupling between the clutch drum and the brake drum and thus minimize a clearance between the components which occurs due to external force.

Furthermore, it is possible to prevent a phenomenon where the components deviate from operating ranges thereof upon operation due to external force.

Furthermore, provision of the securing portions serving as stoppers makes it possible to concentrate an excessive external force and thus achieve improved durability of the components.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
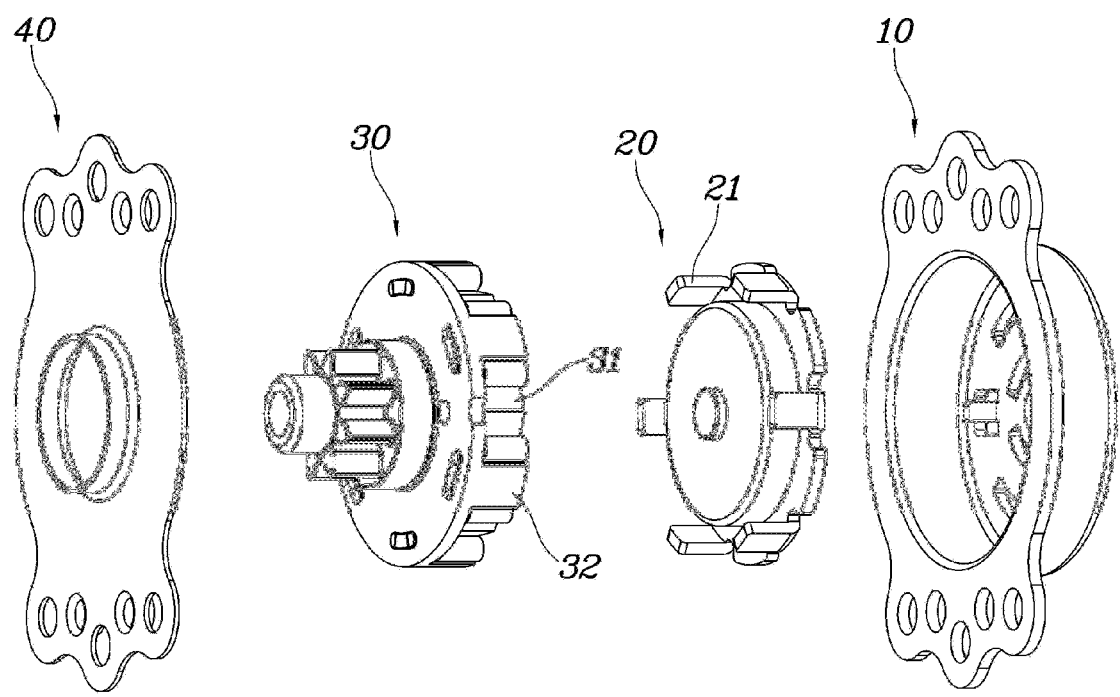
FIG. 1 is a view showing components inside of a housing according to an embodiment of the present invention.

In the following description or specification, the structural or functional description specified to exemplary embodiments according to the concept of the present invention is intended to describe the exemplary embodiments, so it should be understood that the present invention may be variously embodied, without being limited to the exemplary embodiments.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 2:
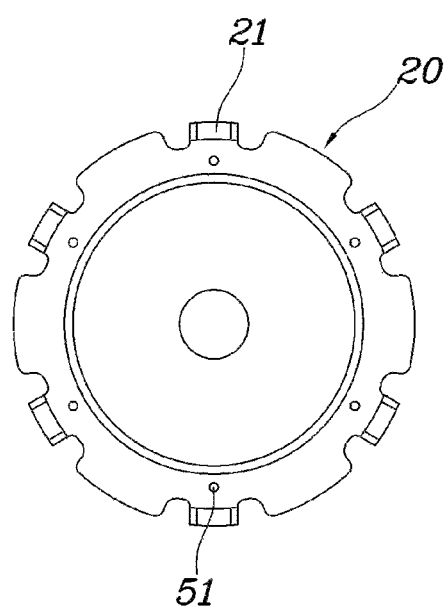
FIG. 2 is a bottom view showing a clutch drum according to the embodiment of the present invention.
Figure 3:
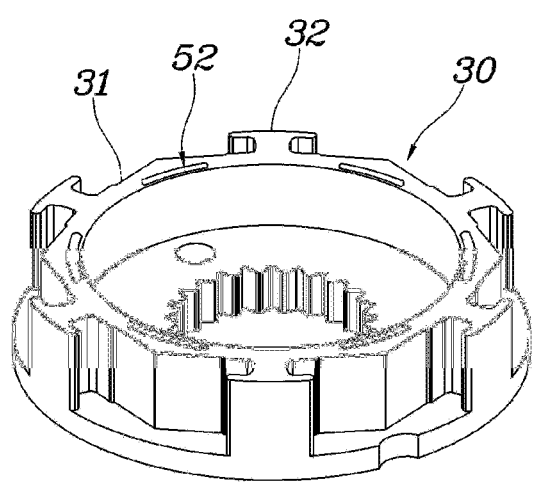
FIG. 3 is a perspective view showing a brake drum according to the embodiment of the present invention.

FIG. 1 is a view showing components inside of a housing 10 according to an embodiment of the present invention, FIG. 2 is a bottom view showing a clutch drum 20 according to the embodiment of the present invention, and FIG. 3 is a perspective view showing a brake drum 30 according to the embodiment of the present invention.

Referring to FIGS. 1 to 3, a seat pumping device for a vehicle according to an embodiment of the present invention includes: the clutch drum 20 turned by receiving torque of a lever (not shown) and having a plurality of compressing protrusions 21 radially formed along an edge thereof to be spaced apart from each other; a brake drum 30 coupled to the clutch drum 20 and having a circular vertical flange 31 protruding toward the clutch drum 20, the vertical flange 31 having a plurality of supporting protrusions 32 protruding laterally of the vertical flange 31 to be arranged between the compressing protrusions 21; and securing portions 51 and 52 provided between the vertical flange 31 and the clutch drum 20 which face each other, the securing portions guiding a relative turning of the clutch drum 20 and the brake drum 30 while blocking a relative translation of the clutch drum 20 and the brake drum 30.

The clutch drum 20 and the brake drum 30 may be seated inside of the housing 10. When a user exerts torque on the lever (not shown), the torque may be transmitted to the clutch drum 20 through a lever bracket (not shown) connected to the lever (not shown) at a position outside of the housing 10 and through a clutch cam (not shown) connected to the lever bracket (not shown) at a position inside of the housing 10.

A housing cover 40 may cover the housing 10 such that the clutch drum 20 and the brake drum 30 are seated inside of the housing 10.

The brake drum 30 may be connected to an opposite side of the clutch drum 20 to output torque to an external rack gear (not shown) and a pinion gear (not shown).

The clutch drum 20 has the a plurality of compressing protrusions 21 radially protruding along the edge thereof toward the brake drum 30 to be spaced apart from each other at regular intervals. The brake drum 30 has the a plurality of supporting protrusions 32 protruding outwardly laterally of the circular vertical flange 31 protruding toward the clutch drum 20. The a plurality of supporting protrusions 32 are arranged between the a plurality of compressing protrusions 21 at positions corresponding to the intervals between the compressing protrusions 21, whereby the clutch drum 20 and the brake drum 30 are coupled to each other.

The compressing protrusions 21 and the support protrusions 32 may be the same in number, and the size of each of the supporting protrusions 32 may be smaller than an interval between adjacent compressing protrusions 21. This makes it possible for the clutch drum 20 and the brake drum 30 to be turned relative to each other.

The securing portions 51 and 52 may be provided on facing surfaces between the vertical flange 31 and the clutch drum 20 so as to guide the relative turning of the clutch drum 20 and the brake drum 30 while blocking the relative translation of the clutch drum 20 and the brake drum 30. Thus, it is possible to prevent a phenomenon where a clearance occurs between the clutch drum 20 and the brake drum 30 horizontally with respect to the turning axis and a phenomenon where the clutch drum 20 and the brake drum 30 are separated externally.

A plurality of securing portions 51 and 52 may be provided to be arranged at positions spaced apart from each other, and may be circumferentially arranged along a circle of which center coincides with the turning axis of either of the clutch drum 20 and the brake drum 30, at positions spaced apart from each other.

More specifically explained, the securing portions 51 and may be comprised of a securing protrusion 51 and an insertion slot 52, and may be formed along a turning range of the clutch drum 20 and the brake drum 30 such that when the clutch drum 20 and the brake drum 30 are turned relative to each other, the securing protrusion 51 is turnable by a predetermined turning angle in a state of being inserted in the insertion slot 52. Thus, the securing protrusion 51 inserted into the insertion slot 52 causes the relative turning of the clutch drum 20 and the brake drum 30 to be guided while causing the relative translation between the clutch drum 20 and the brake drum 30 to be blocked.

The securing protrusion 51 may protrude from the clutch drum 20 or the vertical flange 31 toward the clutch drum 20 or the vertical flange 31 not having the securing protrusion 51. The insertion slot 52 may be formed on a surface of the clutch drum or the vertical flange not having the securing protrusion 51, the surface facing the clutch drum 20 or the vertical flange 31 having the securing protrusion 51, such that the securing protrusion 51 is inserted into the insertion slot 52.

As shown in the drawings, the securing protrusion 51 may protrude from the clutch drum 20 toward the vertical flange 31, and the insertion slot 52 may be formed on a surface of the insertion slot 52, the surface facing the clutch drum 20. As another example, the securing protrusion 51 may protrude from the vertical flange 31 toward the clutch drum 20, and the insertion slot 52 may be formed on a surface of the clutch drum 20, the surface facing the vertical flange 31.

As still another example, a plurality of securing protrusions 51 and a plurality of insertion slots 52 may be provided. A part of the securing protrusions 51 may protrude from the clutch drum 20 toward the vertical flange 31 while a remaining part of the securing protrusions 51 may protrude from the vertical flange 31 toward the clutch drum 20. A part of the insertion slots 52 may be formed on a surface of the vertical flange 31, the surface facing the clutch drum 20, correspondingly to the securing protrusions 51 while a remaining part of the insertion slots 52 may be formed on a surface of the clutch drum 20, the surface facing the vertical flange 31.

The securing protrusion 51 may be configured such that a protruding end thereof has a hemispherical shape. In other words, the securing protrusion 51 may have the hemispherical-shaped end, that is, may be formed in a cylindrical shape having the hemispherical-shaped end, making it possible to naturally guide the relative turning of the clutch drum 20 and the brake drum 30.

The insertion slots 52 may be circumferentially arranged along a circle of which center coincides with a turning axis of the clutch drum 20 and the brake drum 30 that are turned relative to each other such that the securing protrusions 51 are seated in the insertion slots 52 to guide the relative turning of the clutch drum 20 and the brake drum 30. In other words, each of the insertion slots 52 may be configured such that a part thereof has an arc shape while a cross section of the insertion slot 52 has hemispherical opposite ends corresponding to the shape of the ends of the securing protrusions 51.

Figure 4:
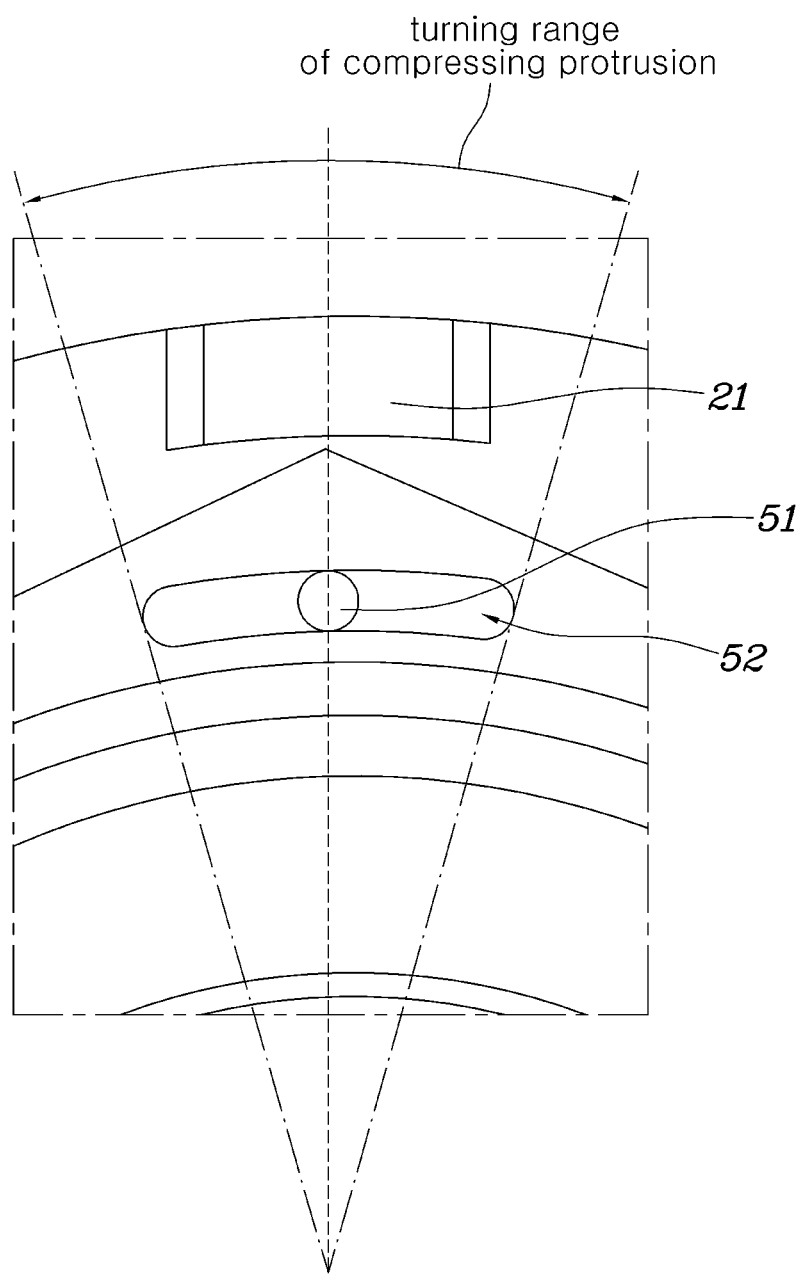
FIG. 4 is a view showing a turning range of an insertion slot according to the embodiment of the present invention.

FIG. 4 is a view showing a turning range of an insertion slot according to the embodiment of the present invention.

Referring to FIG. 4, a circumferential turning range of the insertion slot 52 may be formed such that the securing protrusion 51 is seated in the insertion slot 52 to a turning angle at which the clutch drum 20 is turned relative to the brake drum 30 to transmit torque to the brake drum 30. In other words, the insertion slot 52 may have an arc-shaped turning range such that the clutch drum 20 can be turned relative to the brake drum 30 in a state where the securing protrusion 51 is inserted in the insertion slot 52, and may have a limited turning range to the turning angle at which the clutch drum 20 is turned relative to the brake drum 30 in a state of transmitting torque thereto.

The securing portions 51 and 52 can serve as stoppers for preventing the clutch drum 20 and the brake drum 30 from being turned relative to each other beyond the turning angle in accordance with operation.

The securing protrusions 51 and the insertion slots 52 may be arranged at the same angular interval as either of the compressing protrusions 21 and the supporting protrusions 32. For example, in the embodiment of the present invention, six compressing protrusions 21 and six supporting protrusions 32 are arranged to be spaced apart from each other at angular intervals of 60 degrees, and six securing protrusions 51 and six insertion slots 52 are also arranged to be spaced apart from each other at angular intervals of 60 degrees.

Furthermore, the respective securing protrusions 51 may be arranged to protrude from the clutch drum 20 inwardly of the compressing protrusions 21, while the respective insertion slots 52 may be arranged between the supporting protrusions 32 of the vertical flange 31.

The vertical flange 31 may be configured such that a part thereof protrudes laterally from between the respective supporting protrusions 32, whereby the thickness of the vertical flange 31 increases between the supporting protrusions 32. Accordingly, the respective insertion slots 52 are positioned between the supporting protrusions 32 of the vertical flange 31. Due to this, it possible to maximally ensure structural stability even though the slots are formed.

Furthermore, the respective securing protrusions 51 may be arranged at the same angular position as the compressing protrusions 21 inwardly of the compressing protrusions 21, making it possible for the securing protrusions 51 to be turned at the same turning angle as the compressing protrusions 21 positioned between the supporting protrusions 32.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A seat pumping device for a vehicle, the seat pumping device comprising:
   a clutch drum configured to be turned by receiving torque of a lever, wherein the clutch drum includes a plurality of compressing protrusions radially formed along an edge thereof and spaced apart from each other;
   a brake drum coupled to the clutch drum and having a circular vertical flange protruding toward the clutch drum, the vertical flange having a plurality of supporting protrusions protruding laterally of the vertical flange and arranged between the compressing protrusions; and
   a securing portion provided between the vertical flange and the clutch drum, which face each other, the securing portion guiding a relative turning of the clutch drum and the brake drum while blocking a relative translation of the clutch drum and the brake drum.

2. The seat pumping device of claim 1, wherein the securing portion is provided as a plurality of securing portions arranged at positions spaced apart from each other.

3. The seat pumping device of claim 2, wherein each of the securing portions is circumferentially arranged along a circle of which center coincides with a turning axis of either of the clutch drum and the brake drum, at positions spaced apart from each other.

4. The seat pumping device of claim 1, wherein the securing portion includes:
   a securing protrusion protruding from the clutch drum or the vertical flange toward the clutch drum or the vertical flange not having the securing protrusion; and
   an insertion slot formed on a surface of the clutch drum or the vertical flange not having the securing protrusion and facing a corresponding face of the clutch drum or the vertical flange having the securing protrusion, such that the securing protrusion is inserted into the insertion slot.

5. The seat pumping device of claim 4, wherein the securing protrusion protrudes from the clutch drum toward the vertical flange, and
   the insertion slot is formed on a surface of the vertical flange, the surface facing the clutch drum.

6. The seat pumping device of claim 4, wherein the securing protrusion protrudes from the vertical flange toward the clutch drum, and
   the insertion slot is formed on a surface of the clutch drum, the surface facing the vertical flange.

7. The seat pumping device of claim 4, wherein the securing protrusion and the insertion slot are provided as a plurality of securing protrusions and a plurality of insertion slots, such that a number of the securing protrusions protrude from clutch drum toward the vertical flange while a remaining number of the securing protrusions protrude from the vertical flange toward the clutch drum, and
   a number of the insertion slots are formed on a surface of the vertical flange, the surface facing the clutch drum, correspondingly to the number of the securing protrusions while a remaining number of the insertion slots are formed on a surface of the clutch drum, the surface facing the vertical flange, corresponding to the remaining number of the securing protrusions.

8. The seat pumping device of claim 4, wherein the securing protrusion is configured such that a protruding end thereof has a hemispherical shape, and
   the insertion slot is circumferentially positioned on a circle of which center coincides with a turning axis of the clutch drum and the brake drum, which are turned relative to each other such that the securing protrusion is seated in the insertion slot to guide the relative turning of the clutch drum and the brake drum.

9. The seat pumping device of claim 8, wherein a circumferential turning range of the insertion slot is formed such that the securing protrusion is seated in the insertion slot to a turning angle at which the clutch drum is turned relative to the brake drum to transmit torque to the brake drum.

10. The seat pumping device of claim 4, wherein the securing protrusion and the insertion slot are provided as a plurality of securing protrusions and a plurality of insertion slots, and are arranged at an angular interval corresponding to either of the compressing protrusions and the supporting protrusions.

11. The seat pumping device of claim 10, wherein the respective securing protrusions are arranged to protrude from the clutch drum inwardly of the compressing protrusions, while the respective insertion slots are arranged between the supporting protrusions of the vertical flange.

* * * * *